May 26, 1925.  
E. J. SWEETLAND  
1,539,030  
PRESSURE INDICATING VALVE STEM FOR TIRE TUBES  
Filed Jan. 16, 1919
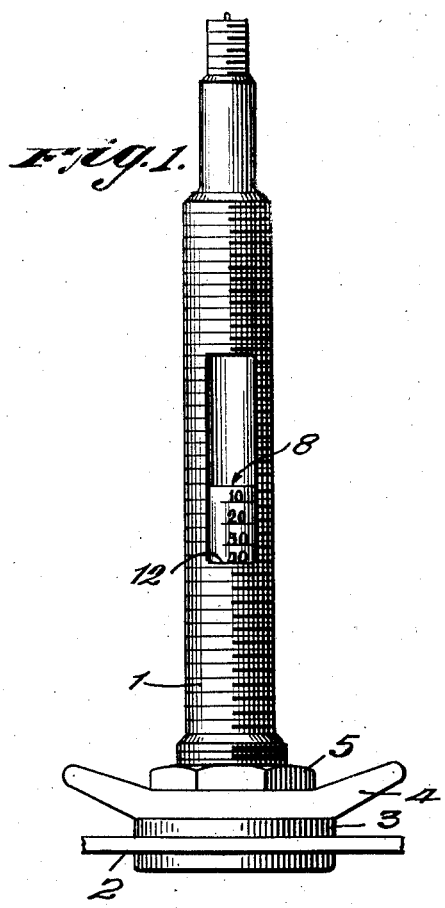
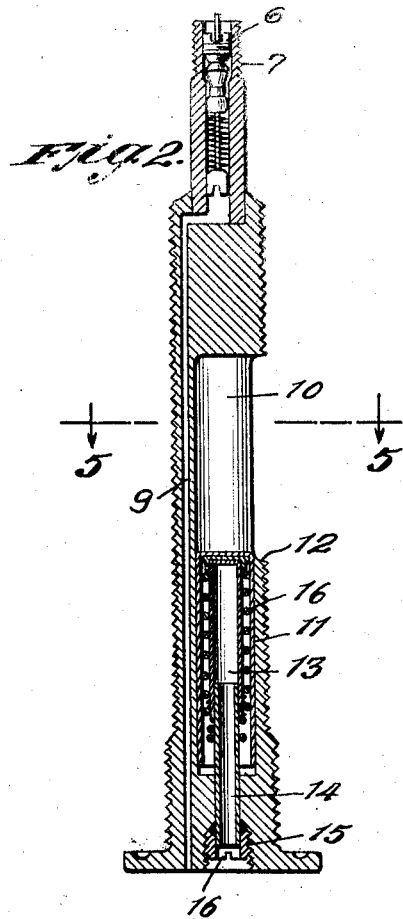
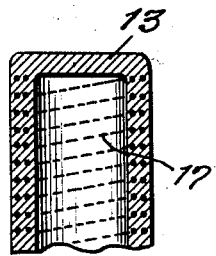
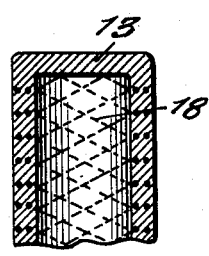
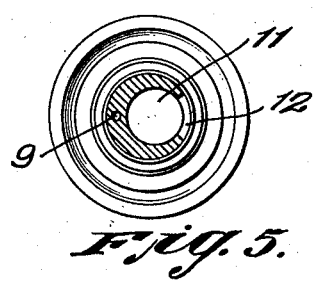
INVENTOR  
ERNEST J. SWEETLAND  
BY  
ATTORNEY Patented May 26, 1925.

1,539,030

UNITED STATES PATENT OFFICE.

ERNEST J. SWEETLAND, OF MONTCLAIR, NEW JERSEY.

PRESSURE-INDICATING VALVE STEM FOR TIRE TUBES.

Application filed January 16, 1919. Serial No. 271,383.

*To all whom it may concern:*

Be it known that I, ERNEST J. SWEETLAND, a citizen of the United States, residing in the town of Montclair, county of Essex, and State of New Jersey, United States of America, have invented certain new and useful Improvements in Pressure-Indicating Valve Stems for Tire Tubes, of which the following is a specification.

My present invention relates to pressure indicating devices and more particularly to indicating devices designed for indicating the degree of inflation of pneumatic vehicle tires and comprehends such a device incorporated in or made as a part of the ordinary valve casing through which the tire is inflated.

In the accompanying drawings,

Figure 1 is a side elevation of a valve stem or casing having a pressure indicator therein, the pressure indicator being shown with the tire under pressure;

Figure 2 is a vertical section of the same, the indicator being shown in its inactive position;

Figure 3 is a vertical, sectional view of a fragmentary portion of a reinforced rubber tube employed in the pressure indicator;

Figure 4 is a view similar to Figure 3 showing an alternative winding of reinforcing threads employed to prevent lateral expansion of the tube under pressure; and Figure 5 is a horizontal section taken on the line 5—5 of Figure 2 in the direction of the arrows.

A valve stem or casing 1 is attached to an inner tube 2 of a pneumatic tire by means of the usual clamping washer 3, spreader 4, and retaining or lock nut 5. A one way valve 6 of usual construction is threaded into the mouth 7 of the valve stem and performs its usual function in a well known manner.

In order to provide for the accommodation of the indicating gage 8 within the valve casing 1 A, a duct or passage-way 9 through which the tire may be inflated or deflated is arranged to extend along one side of the central axis of the casing 1. This arrangement is made conveniently possible by forming the main portion of the casing 1 in which the gage 8 is located and the upper extremity in which the valve 6 is located in two parts and subsequently connecting them together in any suitable manner that will prevent leakage.

The valve casing 1 has a cylindrical bore 10 in which a graduated sleeve 11, forming part of the pressure indicator is reciprocable. This sleeve 11 is visible thru an extended opening in the side of the casing 1, and is controlled by means now to be described to cause its graduations to cooperate with the lower edge 12 of said opening to correctly indicate the air pressure within the tire. The gage sleeve is forced upward by the uper end of an expansible rubber tube or cap 13 on which it rests. The lower end of the rubber tube 13 is secured upon a rigid tube 14, of metal, glass or other suitable material, that communicates with the interior of the tire to admit air to the interior of the rubber tube 13. Care is taken to prevent leakage of air around the tube 14, provision being made of a suitable packing ring 15 at the lower end of said tube 14, which is compressed by means of a nut 16 to form an air-tight joint. The air entering the pressure chamber of the tube 13 thru the tube 14 extends the expansible tube 13, thus forcing the graduated indicating sleeve 11 upward so as to expose the scale thereon. A tension coil spring 16 located in the annular space between the interior of the sleeve 11 and the exterior of the tube 13 is connected at its upper end to the sleeve 11 and at its lower end to the tube 14. This spring acts in opposition to the upward pressure of the tube 13 on the sleeve 11, the arrangement being such that the spring will be stretched in proportion to the pressure in the tire, and hence will permit the indicator sleeve 11 to be raised in proportion to such pressure.

It should be noted that by locating the expansible tube 13 within the graduated sleeve 11, and the coil spring also within the sleeve, a very compact arrangement is obtained. It is possible in this manner to make both the expansible tube and the coil spring of ample length without increasing the length of the device. At the same time the sleeve is utilized as a housing to protect both the tube and spring against dirt and water, and against injury by collision with extraneous objects.

The rubber tube 13 may be reenforced by spirally wound threads 17 (see Figure 3). This prevents the tube 13 from bulging and entering between the convolutions of the spring, but at the same time permits longitudinal extension of the tube when the gage is operating. To add further strength the spirals may be arranged in criss-cross fashion as shown at 18 in Figure 4. In the manufacture of either form, it is desirable to first form a tube of uncured rubber on a mandrel, then wrap the thread which has previously been soaked in rubber cement spirally upon the formed tube, which also has been precoated with the same cement. Then a second layer of rubber is placed over the spiral thread, and the whole is enclosed in a casing or wrapper of cloth and subjected to vulcanization. I have found in practice that a tube formed in this manner extends longitudinally with practically no more restraint than a tube made of pure gum and that it will resist lateral extension due to internal pressure without material increase in diameter.

While I have illustrated and described a preferred embodiment of the principles of my invention, I do so by way of example, wishing to reserve unto myself all structural variations in which said principles may be susceptible of embodiment.

Having thus described my invention what I claim as new herein and desire to secure by Letters Patent is:

1. A pressure indicating device comprising a casing, a sleeve movable within said casing and provided with graduations, a tube having means embedded therein for preventing lateral while permitting longitudinal extension of the tube, and a coiled spring located in the annular space between said sleeve and said tube and arranged to resist the longitudinal extension of the latter.

2. A pressure indicating device comprising a casing, a sleeve movable within said casing and provided with graduations, a tube having circumferentially arranged threads embedded therein for preventing lateral while permitting longitudinal extension of the tube, and a coiled spring located in the annular space between said sleeve and said tube and arranged to resist the longitudinal extension of the latter.

3. As a new article of manufacture, a pressure tube of elastic material having means embedded therein for preventing lateral while permitting longitudinal extension of the tube.

4. As a new article of manufacture, a pressure tube of elastic material having circumferentially arranged threads embedded therein for preventing lateral while permitting longitudinal extension of the tube.

ERNEST J. SWEETLAND.